No. 733,794. PATENTED JULY 14, 1903.
G. G. BARKER & H. CORL.
MACHINE FOR TESTING CUTTER BAR SECTIONS.
APPLICATION FILED NOV. 13, 1902.
NO MODEL. 6 SHEETS—SHEET 3.
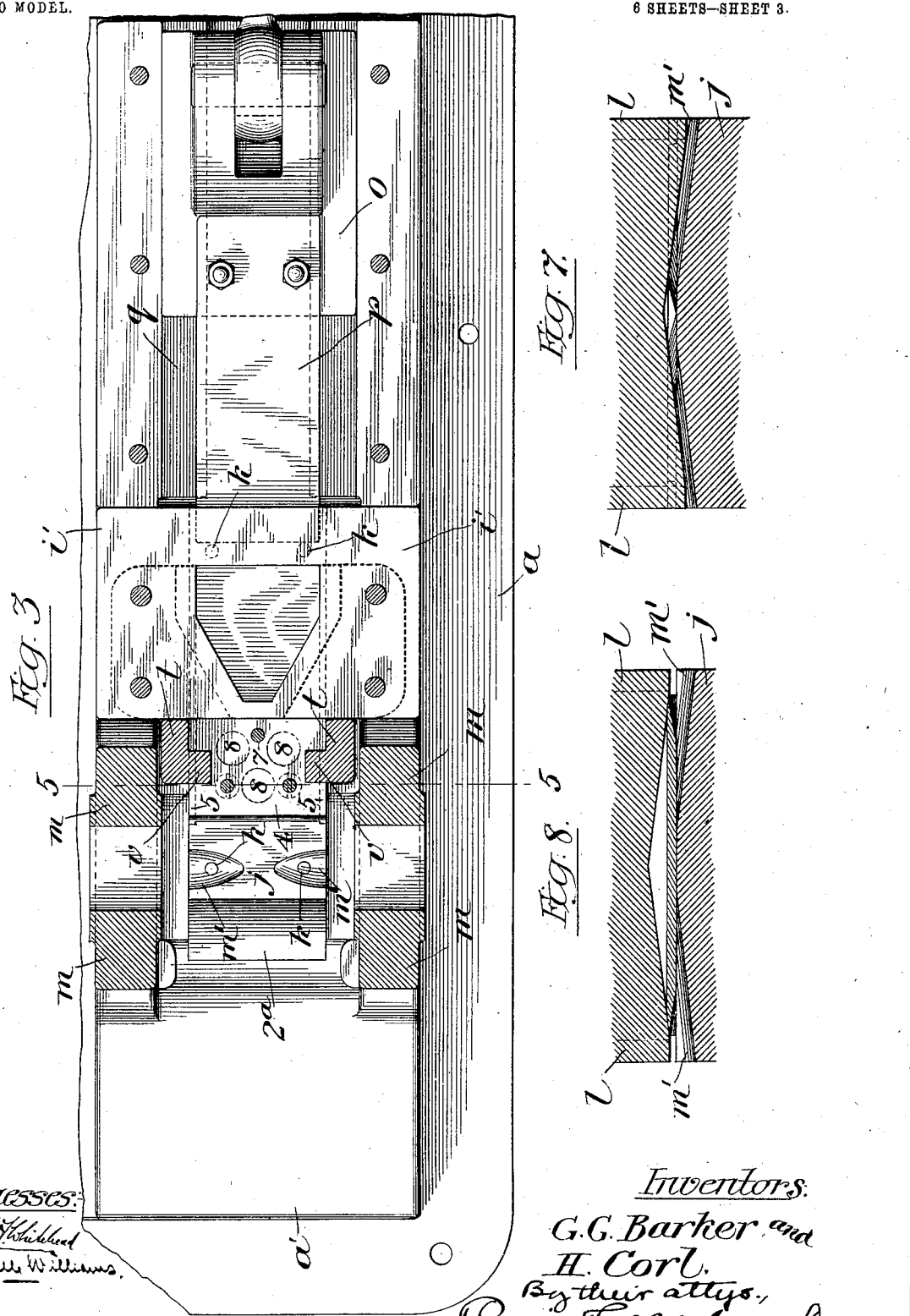

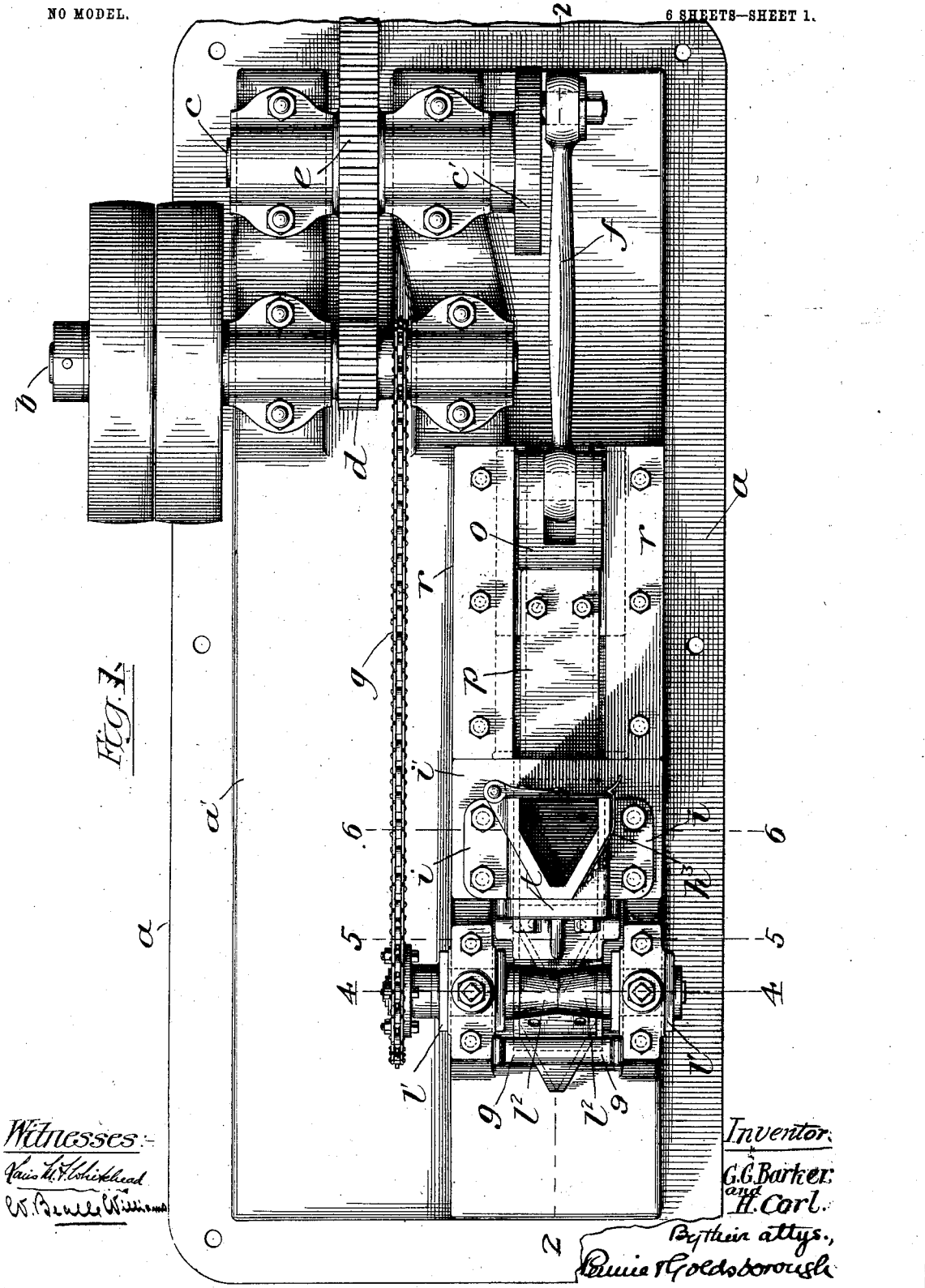

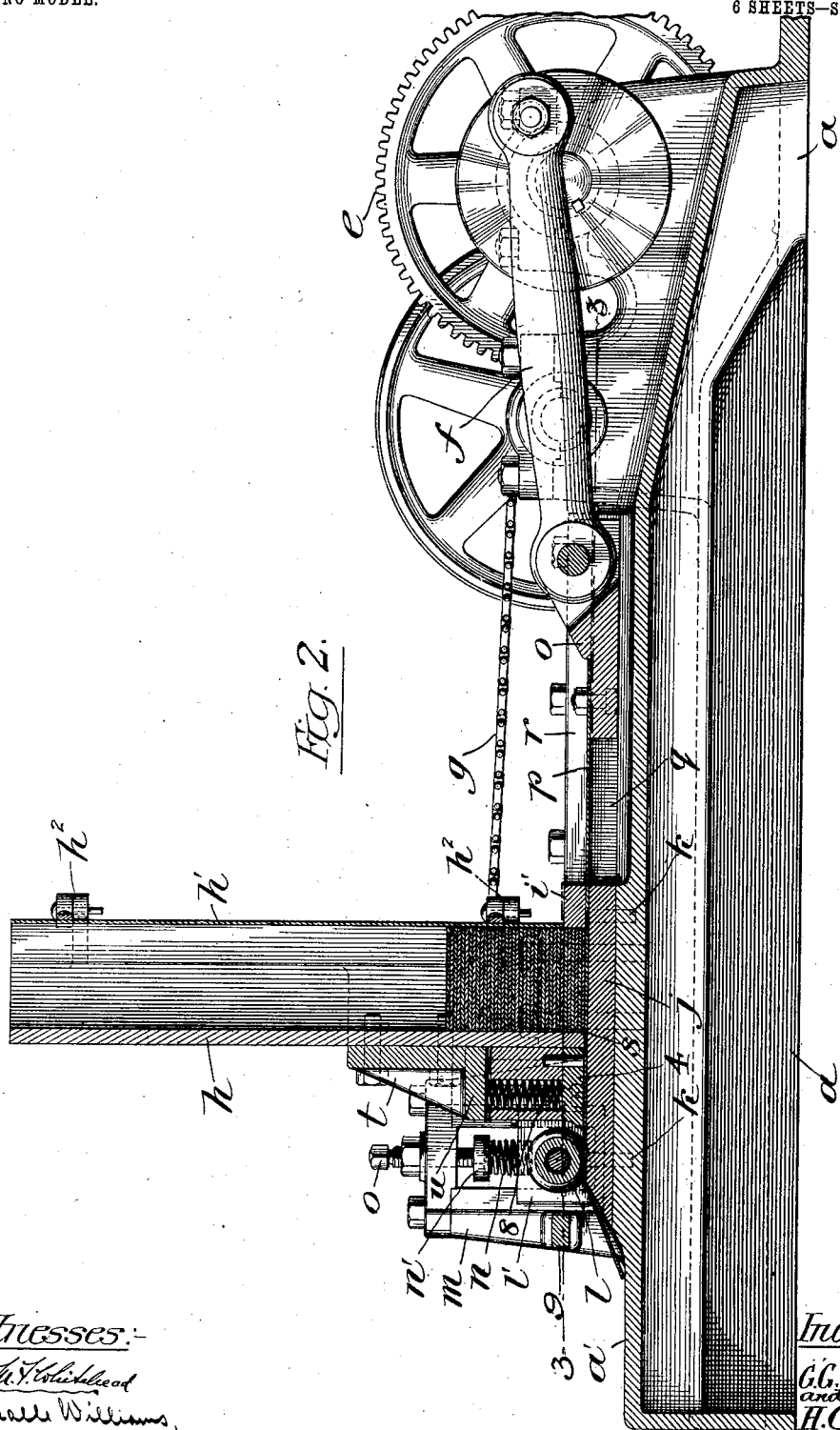

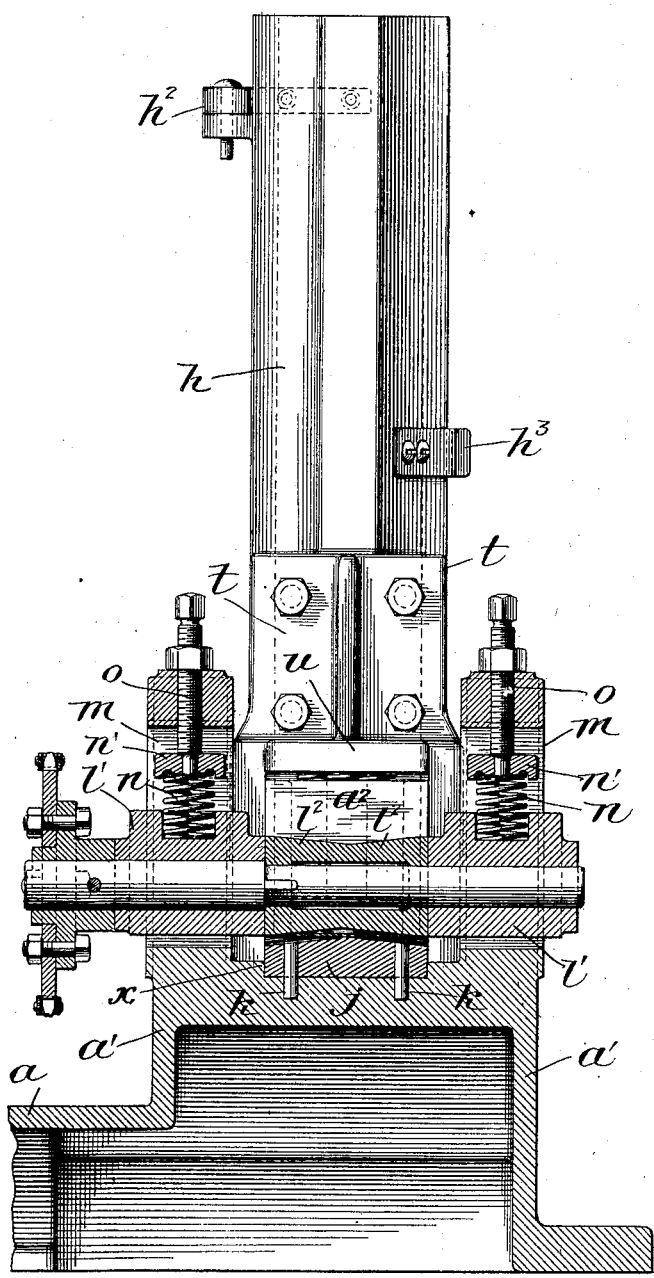

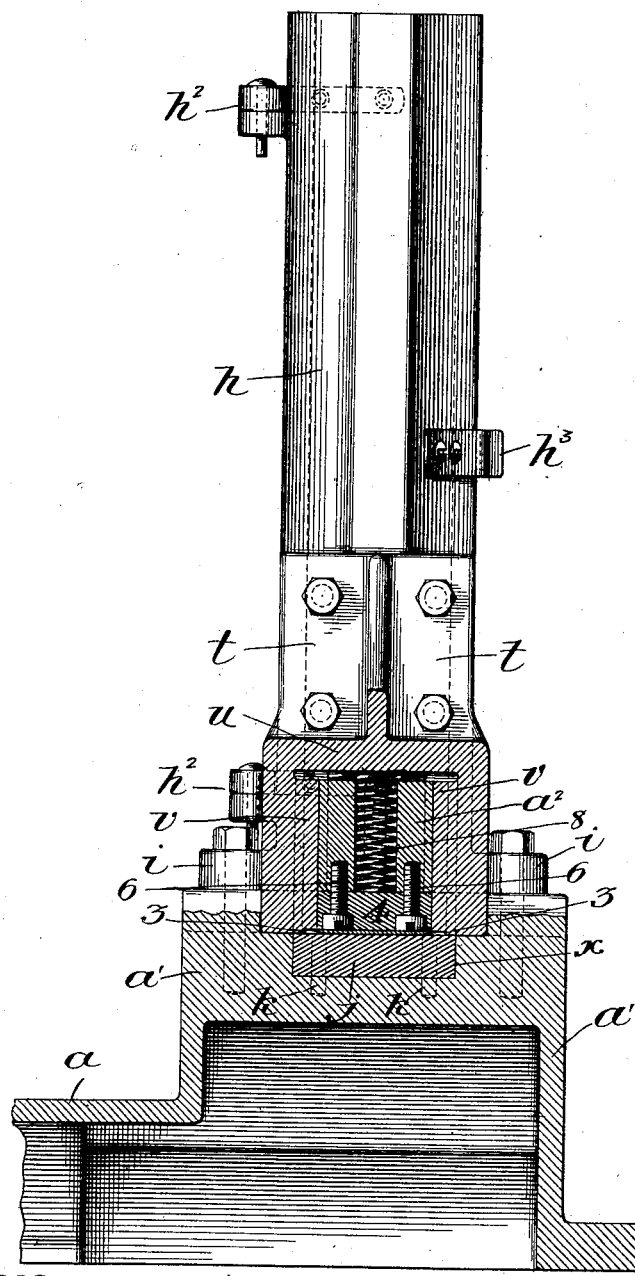

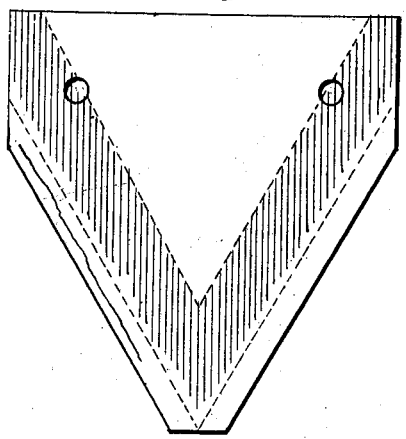
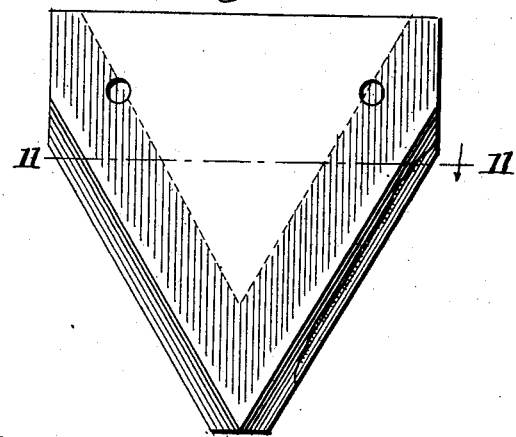
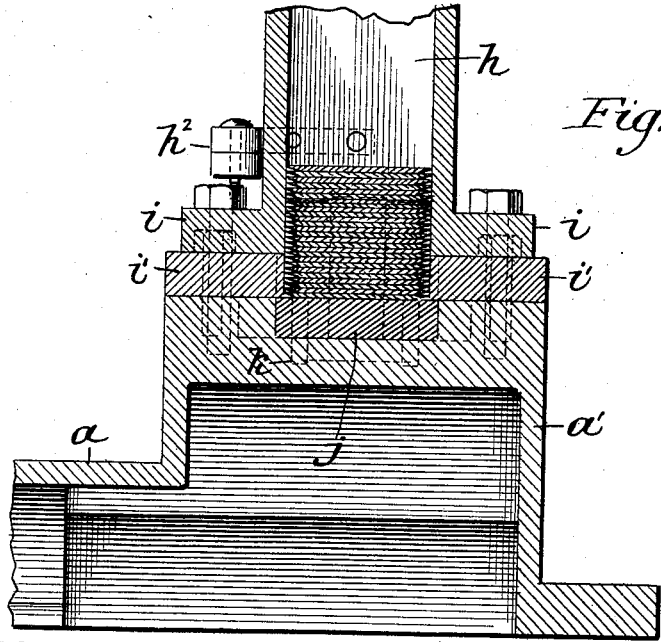

No. 733,794. Patented July 14, 1903.

UNITED STATES PATENT OFFICE.

GEORGE G. BARKER AND HENRY CORL, OF CHICAGO, ILLINOIS, ASSIGNORS TO THE INTERNATIONAL HARVESTER COMPANY, OF CHICAGO, ILLINOIS, A CORPORATION OF NEW JERSEY.

MACHINE FOR TESTING CUTTER-BAR SECTIONS.

SPECIFICATION forming part of Letters Patent No. 733,794, dated July 14, 1903.

Application filed November 13, 1902. Serial No. 131,211. (No model.)

*To all whom it may concern:*

Be it known that we, GEORGE G. BARKER and HENRY CORL, citizens of the United States, residing at Chicago, county of Cook, State of Illinois, have invented certain new and useful Improvements in Machines for Testing Cutter-Bar Sections; and we do hereby declare the following to be a full, clear, and exact description of the invention, such as will enable others skilled in the art to which it appertains to make and use the same.

The object of the invention is to provide a power-machine for testing the sections of mowing and reaping machine cutter-bars for the purpose of ascertaining the presence of and locating any flaws in the metal forming their cutting edges. As is well understood by those acquainted with this art, the blanks from which these sections are made are tempered along the sides, which ultimately become the cutting edges. This tempering frequently causes fire-cracks, which when the blanks are subsequently ground form defective cutting edges, and the purpose of the present invention is to subject the sections mechanically to pressure along their edges, so that the defective ones will have their edges bent down, so as to be easily detected or so that the cracked portions will be actually broken out.

The invention is illustrated in the accompanying drawings, wherein—

Figure 1 is a plan view of the entire machine. Fig. 2 is a vertical central section on the line 2 2. Fig. 3 is partly a plan and partly a horizontal section on the line 3 3 of Fig. 2. Fig. 4 is a vertical cross-section on the line 4 4 of Fig. 1. Fig. 5 is a similar section on the line 5 5 of the same figure. Fig. 6 is a detail showing a vertical cross-section on the line 6 6 of Fig. 1. Figs. 7 and 8 are details in section through the axis of the conical roller and the section-supporting plate, the former showing the position of parts just after a section has entered under the roller and the latter showing the position of the same parts just before the section passes out. Fig. 9 is a view of the under or plain side of a section before it has been tested, showing the tempered portion and the usual location of the crack. Fig. 10 is a similar view of the opposite side of the section after it has been tested, showing the cracked edge bent down; and Fig. 11 is a section of the same section on the line 11 11 of Fig. 10, showing in another way the result of subjecting it to the action contemplated by the present invention.

Referring to the views, $a$ denotes a heavy rectangular base or bed which is adapted to be secured to the bench and supports on a raised portion $a'$ the operative parts. The main driving-shaft is shown at $b$, and $c$ denotes a counter-shaft that is provided with a crank-disk $c'$ at its outer end. These two shafts are journaled crosswise of the machine at the rear end in pedestals rising from the base, as clearly shown in Figs. 1 and 2. The counter-shaft is geared to the main shaft by gearing $d$ and $e$, and the crank-disk is connected by a pitman $f$ to the device for feeding the sections through the machine. The main shaft is geared by a chain belt $g$ to the roller which operates on the sections and which is located at the front end of the machine.

The sections to be tested, after having their edges ground, are stacked into a magazine $h$, having a door $h'$ at its rear side, which opens and closes on hinges $h^2$ and has a spring-catch $h^3$ to hold it closed. The magazine is of sufficient height to hold a large supply of sections and is made in cross-section of the same generally triangular shape as the sections themselves. At its lower end the side walls of the magazine are provided with ears or lugs $i$, by means of which the receptacle is bolted down upon the machine-base, the bolts passing also through a plate $i'$, of hardened steel, secured thus upon the raised part $a'$ of the base. The plate $i'$ under the magazine is provided with an opening of the size and shape of the sections, and underneath this there is another plate $j$, which is set into the upper surface of the machine-base and is secured thereto by dowels $k$. The sections in the magazine rest upon this plate $j$, which forms the only bottom the magazine has. It also forms the support for the sections in transit from the magazine and while they are being subjected to the action of the testing-roller, as will now be fully described. This testing-roller is denoted by $l$ in all the figures. It is journaled in pillow-blocks $l'$, that are mounted so as to be vertically adjustable between pillars or vertical guides $m$ at the sides of the machine a short distance in front of the magazine. The roller is positively driven by the chain $g$ from the main drive-shaft and is held down to its work by springs $n$, that react between the upper sides of the pillow-blocks and saddles $n'$, that are connected to adjustable screws $o$, so that the pressure of the roller is readily adjustable by means of the screws. The roller is formed, preferably, of a hardened-steel shell with oppositely-extending conical surfaces $l^2$, flaring outwardly from the center toward the ends, the object of this arrangement being to permit the surface of the roller to follow the inclined edges of the sections as they pass point foremost under it.

The upper surface of the supporting-plate $j$ for the sections is provided near its front end under the roller with conical grooves $m'$, which extend inward from opposite sides of the plate toward and near, but not quite to, the center, so as to leave the central part of the plate plain and ungrooved immediately underneath the roller, where the two conical surfaces join each other.

The sections are stacked in the magazine upside down, as shown in Fig. 11, and are fed forward over the supporting-plate $j$ to the roller one at a time, with their ends or points foremost, by a reciprocating-pusher which consists of a plate $p$, secured to a slide $o$, that works to and fro in a guideway $q$ on the raised part $a'$ of the base of the machine. The slide is secured to the front end of the pitman $f$, already described, and the pusher is reciprocated by the revolution of the crank-disk on the counter-shaft. The slide $o$ is held down in its guideway by narrow plates $r$, that are secured to the base $a'$ on each side of the way and have their edges slightly overlapping the slide, as best shown in Fig. 1.

The under side of the plate $i'$ is provided with a wide shallow groove just equal to the width and thickness of one section, and the pusher $p$ fits snugly in this groove and slides under the bottom of the magazine on the upper surface of the supporting-plate $j$. This groove in the plate $i'$ is indicated by the heavy black lines in Fig. 2 and in dotted lines in Figs. 1 and 3, and as the plate extends to the outer wall on the front side of the magazine the edge of the groove is rounded at the front inner corner, as shown at $s$ in Fig. 2, so as to prevent the sections which are pushed from the magazine under this part of the plate from being caught and broken or injured.

The length of the pusher's stroke is such that each forward stroke pushes the lowermost section clear out of the magazine toward and under a presser-plate, to be presently described. On the return stroke the pusher is withdrawn clear behind the magazine, and the sections settle down on the supporting-plate $j$ ready to have this operation repeated. On the next forward movement of the pusher the section which was first passed under the presser-plate is pushed still farther forward and under the roller by the section last ejected from the magazine. As each section is pushed forward from the magazine to the roller it is desirable to hold them down on the supporting-plate *en route* between the magazine and the roller, and for this purpose there is provided a yielding presser of preferably the following construction:

To the front side of the magazine there is bolted or otherwise secured a stout bracket $t$, which has a horizontal shelf $u$ and vertical guides under the shelf formed by flanges $v$, projecting inwardly from the side walls. The bracket is fastened to the magazine so that its sides rest upon the raised part $a'$ of the machine-bed, and the lower ends of the flanges $v$ are grooved or provided with rabbets or grooves 3, corresponding with the grooves already described in the under surface of the base-plate $i'$ of the magazine, and the rear edge of the presser-plate is also preferably rounded, so as to prevent the sections from catching against it as they pass from the magazine.

The presser proper is a hardened-steel plate 4, which fits in between the walls of the bracket $t$ and is notched at the sides to receive the flanges $v$, as best shown in Figs. 2, 3, and 5. The side edges of this plate are rabbeted, as indicated by the dotted lines 5 in Fig. 3, to correspond with the groove in the bottom of the plate $i'$ and the rabbets 3 in the flanges $v$ of the bracket. The plate is secured by screws 6 and dowel-pin 7 or otherwise to the foot of a block $a^2$, so that it constitutes a removable and renewable wearing-surface for the block, and the block itself is provided with vertical holes or cells in which are inclosed coil-springs which react between the shelf of the bracket and the upper surface of the plate 4 to press the block and plate elastically down on the section-supporting plate $j$ between the front end of the magazine and the testing-roller.

Beyond the roller the supporting-plate has its end beveled or downwardly inclined, as shown at $2^a$ in Fig. 3, so that the sections may promptly and easily slide off onto the raised part $a'$ of the machine-base, whence they may be pushed or otherwise removed to any convenient receptacle.

As will be understood from the above description, the sections are pushed one at a time from the magazine to and under the roller by the plate $p$ of the pusher, and they are supported clear across from side to side by the plate $j$ with their plain sides uppermost. In order to permit the roller to descend low enough for the center part to act on the points of the sections, the grooves $m'$ are formed in the plate under the roller. These grooves correspond in extent and position with the conical surfaces of the roller and permit the latter to begin its action on the sections in the lowered position. (Indicated in Fig. 7.) As the sections pass under the roller the latter rises, as indicated in Fig. 8.

As the sections issue from beneath the roller there is danger of their being thrown up by the passage of the roller over their rear edge. We therefore provide a guard 9 in front of the roller and extending from one of the side standards $m$ to the other, so that any sections that happen to be thrown out in this way by the roller will strike the guard and be prevented from flying up and striking the operator. Preferably this guard is in the form of a flat wooden bar; but obviously any other form, construction, or material might be employed that would effect the particular purpose.

The construction being as above described, it is believed the operation of the machine will be clearly understood without further detail description. The sections are put into the magazine after their edges have been ground and with the plain flat sides uppermost. As they are pushed one at a time end foremost under the testing-roller the conical surfaces of the roller begin to act immediately on the point of the sections, and as the sections pass under the roller the conical surfaces of the latter travel over their edges, the point of contact of the latter with the roller gradually approaching the outer ends of the roller in accordance with the gradually-diverging inclinations of the edges of the sections. The sections are passed under the roller upside down, so that their beveled edges will not be supported by the underlying plate. The pressure of the conical surfaces of the roller will therefore bend downward the edges of any sections which are not sufficiently strong to withstand the pressure, or the defective portions may actually be broken out. The tension of the springs which hold the roller down is adjusted so as to exert a pressure that will not be injurious to sections that are perfect, but will be sufficient to break or bend the edges of imperfect sections. In this way cutter-sections may be tested with great rapidity and accuracy and without particular attention on the part of the operator.

Having described our invention, what we claim, and desire to secure by Letters Patent, is—

1. In a machine for testing cutter-bar sections, the combination of a plate for supporting the sections and on which they slide end foremost, and a roller overlying the plate and having a conical surface to follow the inclined edge of the sections as they pass beneath it.

2. In a machine for testing cutter-bar sections, the combination of a plate for supporting the sections and on which they slide end foremost, a roller overlying the plate and having a conical surface to follow the inclined edge of the sections as they pass under it, and means for pressing the roller elastically down on the sections.

3. In a machine for testing cutter-bar sections, the combination of a plate for supporting the sections and on which they slide end foremost, an overlying spring-pressed plate to hold the sections down, a roller beyond the spring-pressed plate and overlying the supporting-plate, and means for pushing the sections forward on the supporting-plate from under the spring-pressed plate to and beneath the roller, said roller having a conical surface to follow the inclined edge of the sections.

4. In a machine for testing cutter-bar sections, the combination of a plate for supporting the sections and on which they slide end foremost, a roller overlying the plate and having a conical surface to follow the inclined edge of the sections as they pass under it, an overlying spring-pressed plate to hold the sections down on the supporting-plate behind the roller, and a guard in front of the roller to prevent the sections from being thrown up as they pass from under the roller.

5. In a machine for testing cutter-bar sections, the combination of a plate for supporting the sections and on which they slide end foremost, and a roller overlying the plate and having oppositely-disposed, outwardly-flaring, conical surfaces to follow the inclined edges of the sections as they pass beneath it, the supporting-plate having transverse grooves extending inwardly under the roller.

6. In a machine for testing cutter-bar sections, the combination of a plate for supporting the sections and on which they slide end foremost, a roller overlying the plate and having oppositely-disposed, outwardly-flaring, conical surfaces to follow the inclined edges of the sections as they pass beneath it, and transverse grooves in the supporting-plate extending from opposite sides inwardly under the conical surfaces of the roller, the roller being movable toward and from the plate and the grooves being intended to receive the conical ends of the roller so as to permit its center to approach the surface of the plate.

7. In a machine for testing cutter-bar sections, the combination of a plate for supporting the sections and on which they slide end foremost, a magazine at one end of the plate for holding a supply of sections, a roller overlying the plate at the other end and having conical surfaces to follow the inclined edges of the sections, a reciprocating pusher sliding under the magazine toward the roller, and an overlying spring-pressed plate between the magazine and the roller for holding the sections down on the supporting-plate in transit from the magazine to the roller.

8. In a machine for testing cutter-bar sections, the combination of a plate for supporting the sections and on which they slide end foremost, and means opposing the plate and having inclined surfaces to press elastically upon the diagonal edge of the sections as they pass between said surfaces and plate.

In testimony whereof we affix our signatures in presence of two witnesses.

GEORGE G. BARKER.
HENRY CORL.

Witnesses:
CHAS. N. CHAMBERS,
A. A. BEWLEY.